(12) United States Patent
Pflüger et al.

(10) Patent No.: US 12,247,932 B2
(45) Date of Patent: Mar. 11, 2025

(54) ANTENNA ASSEMBLY FOR EMITTING MICROWAVES, AND MEASURING ASSEMBLY HAVING AT LEAST ONE SUCH ANTENNA ASSEMBLY

(71) Applicant: Endress+Hauser Flowtec AG, Reinach (CH)

(72) Inventors: Stefan Pflüger, Munich (DE); Thilo Ihringer, Rheinfelden (DE)

(73) Assignee: Endress+Hauser Flowtec AG, Reinach (CH)

( * ) Notice: Subject to any disclaimer, the term of this patent is extended or adjusted under 35 U.S.C. 154(b) by 428 days.

(21) Appl. No.: 17/756,189

(22) PCT Filed: Nov. 9, 2020

(86) PCT No.: PCT/EP2020/081431
§ 371 (c)(1),
(2) Date: May 18, 2022

(87) PCT Pub. No.: WO2021/099152
PCT Pub. Date: May 27, 2021

(65) Prior Publication Data
US 2022/0349840 A1 Nov. 3, 2022

(30) Foreign Application Priority Data

Nov. 21, 2019 (DE) ...................... 10 2019 131 504.2

(51) Int. Cl.
*G01R 27/32* (2006.01)
*G01N 22/00* (2006.01)
*H01Q 13/06* (2006.01)

(52) U.S. Cl.
CPC .............. *G01N 22/00* (2013.01); *H01Q 13/06* (2013.01)

(58) Field of Classification Search
CPC ........ G01N 22/00; H01Q 13/06; H01P 1/042; H01P 5/103
See application file for complete search history.

(56) References Cited

U.S. PATENT DOCUMENTS

| 5,851,083 A | 12/1998 | Palan |
| 8,531,337 B2 * | 9/2013 | Soler Castany ....... H01Q 1/242 343/702 |

(Continued)

FOREIGN PATENT DOCUMENTS

| DE | 3633086 A1 | 6/1987 |
| DE | 19641036 A1 | 4/1998 |

(Continued)

*Primary Examiner* — Thang X Le
(74) *Attorney, Agent, or Firm* — Mark A. Logan; Endress+Hauser (USA) Holding, Inc.

(57) ABSTRACT

An antenna assembly for emitting microwaves comprises a dielectric hollow conductor element and a support element, wherein the hollow conductor element has an electrically conductive surface along a circumferential lateral face, the hollow conductor element has an electrically non-conductive emission face, and the hollow conductor element has a coupler receptacle. The support element contains a material having a modulus of elasticity of no less than 50 GPa. The support element surrounds the hollow conductor element at least along the lateral face. The hollow conductor element is fixed in the support element. The support element has an emission opening, and the emission face aligns with the emission opening. The hollow conductor element has a permittivity of no less than 8 at 2 GHz, the hollow conductor element containing a ceramic material, in particular aluminium oxide, zirconium oxide or titanium oxide.

14 Claims, 2 Drawing Sheets

(56) References Cited

U.S. PATENT DOCUMENTS

| | | | | |
|---|---|---|---|---|
| 2004/0056667 A1* | 3/2004 | Lutke | ............... | H01Q 1/225 |
| | | | | 324/644 |
| 2004/0227682 A1* | 11/2004 | Anderson | ............ | H01Q 7/00 |
| | | | | 343/742 |
| 2009/0302867 A1* | 12/2009 | Schroth | ............ | G01F 25/20 |
| | | | | 324/642 |
| 2013/0113500 A1* | 5/2013 | Chen | ............... | G01N 22/00 |
| | | | | 324/637 |
| 2015/0168202 A1* | 6/2015 | Blodt | ............. | G01F 23/296 |
| | | | | 73/290 V |
| 2021/0151883 A1* | 5/2021 | Misaki | ........... | H01L 27/1255 |

FOREIGN PATENT DOCUMENTS

| | | | |
|---|---|---|---|
| DE | 10023497 | A1 | 11/2001 |
| DE | 10051297 | A1 | 4/2002 |
| DE | 102012105281 | A1 | 12/2013 |
| EP | 0922942 | A1 | 6/1999 |
| EP | 0935127 | B1 | 8/1999 |
| JP | 2000321218 | A | 11/2000 |

\* cited by examiner

ANTENNA ASSEMBLY FOR EMITTING MICROWAVES, AND MEASURING ASSEMBLY HAVING AT LEAST ONE SUCH ANTENNA ASSEMBLY

CROSS-REFERENCE TO RELATED APPLICATIONS

The present application is related to and claims the priority benefit of German Patent Application No. 10 2019 131 504.2, filed on Nov. 21, 2019 and International Patent Application No. PCT/EP2020/081431 filed on Nov. 9, 2020, the entire contents of which are incorporated herein by reference.

TECHNICAL FIELD

The present invention relates to an antenna assembly for emitting microwaves and to a measuring assembly having at least one such antenna assembly. It is known from the literature that the complex-valued permittivity of a medium can be deduced from transit time and damping of the propagation of an electromagnetic wave in this material. The complex-valued permittivity can in turn be used to draw conclusions about media properties, such as the water content.

BACKGROUND

Measuring assemblies for determining dielectric properties, such as the complex-valued permittivity of process media, are therefore known. The published patent application DE 30 38 725 A1 discloses a device for determining moisture. The published patent applications DE 44 26 280 A1 and DE 101 64 107 C1 disclose apparatuses for measuring the loading of a gas stream with solids content. Publication US 2016 313 259 A1 discloses a temperature compensation for the determination of dielectric properties of a medium. WO 1991 005 243 A1 discloses an apparatus for measuring the concentration of two substances. The published patent application DE 10 2017 131 269 A1 discloses an apparatus for determining the fat content of milk.

Patent GB 2 293 014 discloses a measuring assembly with a hollow conductor antenna having a stainless steel body, into the cavity of which a glass ceramic filling is fused. This firstly requires a complicated production and, secondly, the antenna has a large volume, since the permittivity of the glass ceramic is comparatively low.

SUMMARY

The invention is therefore based upon the aim of providing a compact hollow conductor antenna which has high pressure and temperature resistance and can be used in a large frequency range.

The antenna assembly according to the invention for emitting microwaves comprises:
a dielectric hollow conductor element; and
a support element;
wherein the dielectric hollow conductor element has an electrically-conductive surface at least along a circumferential lateral surface,
wherein the dielectric hollow conductor element has an electrically non-conductive emission surface,
wherein the dielectric hollow conductor element has a coupler receptacle;
wherein the support element has a material having a modulus of elasticity of not less than 50 GPa, in particular not less than 150 GPa;
wherein the support element surrounds the dielectric hollow conductor element at least along the lateral surface,
wherein the dielectric hollow conductor element is fixed in the support element,
wherein the support element has an emission opening, wherein the emission surface is aligned with the emission opening.

In a development of the invention, the dielectric hollow conductor element has a permittivity of not less than 8 at 2 GHz, in particular not less than 9.5 at 2 GHz.

In a development of the invention, the dielectric hollow conductor element has a ceramic material, in particular aluminum oxide, zirconium oxide, or titanium dioxide.

In a development of the invention, the dielectric hollow conductor element has a basic shape of a parallelepiped, in particular of a cuboid.

In a development of the invention, the electrically-conductive surface of the dielectric hollow conductor element comprises a metallic coating, as a result of which a filled hollow conductor is formed.

In a development of the invention, the metallic coating comprises an active hard solder.

With the above material selection and the above shape, a compact antenna can be realized, because the size of the antenna is determined by the cutoff frequency $f_c$ of the filled hollow conductor. For the commonly used fundamental mode TE10 of a rectangular hollow conductor having the rectangular sides a, b, the following applies: $a=c_d/(2\ f_c)$, wherein, for the propagation velocity $c_d$ in the dielectric, $c_d=c_0/\varepsilon_r^{1/2}$ applies. The size of the antenna is thus inversely proportional to the square root of the permittivity of the dielectric filling material. With a permittivity $\varepsilon_{r,S\text{-}Glass} \approx 5.2$, an antenna hollow conductor of this kind would thus have, in cross-section, a minimum width of approximately 3.3 cm at a cutoff frequency $f_c=2$ GHz. On the other hand, if a dielectric having a permittivity $\varepsilon_r$ of at least 8 at 2 GHz is used, the minimum width is only 2.7 cm.

This is advantageous insofar as the aperture in the support element is then also limited to this dimension. The selected materials for the dielectric furthermore significantly increase the transmittance into an aqueous medium in comparison to antennas with a dielectric made of glass.

In a development of the invention, the coupler receptacle comprises a bore through which a pin-shaped coupler, in particular coaxial coupler, extends which is terminated with a capacitively-acting element.

In a development of the invention, the capacitively-acting element has a capacitor, e.g., in the form of a printed circuit board piece with an integrated capacitor, a coaxial capacitor, or an open line piece.

In a development of the invention, the support element has electrically-conductive surfaces which surround the dielectric hollow conductor element.

In a development of the invention, the support element has a metallic material, in particular steel.

In a development of the invention, the support element has a hollow conductor chamber for the dielectric hollow conductor element, wherein the hollow conductor chamber has cross-sections which run in parallel to the emission surface and are filled by the dielectric hollow conductor element to at least 90%, in particular 95%, of the cross-sectional area.

In a development of the invention, the dielectric hollow conductor element is affixed with a polymer in the hollow conductor chamber.

In a development of the invention, the support element has a process connection for connecting the antenna assembly to an antenna opening of a pipeline or of a container in order to position the emission opening in the region of the antenna opening.

The measuring assembly according to the invention comprises at least one antenna assembly according to the invention; a measuring tube having an antenna opening for each antenna assembly, an antenna assembly being mounted at each antenna opening, and a measuring and operating circuit connected to each antenna assembly by means of a respective signal line.

In a development of the invention, the measuring tube has two, mutually-opposite antenna openings, one of the antenna assemblies according to the invention being mounted at each of the antenna openings.

BRIEF DESCRIPTION OF THE DRAWINGS

The invention is described in the following in further detail on the basis of the exemplary embodiment shown in the figures.

The following are shown.

DETAILED DESCRIPTION

Figure 1:
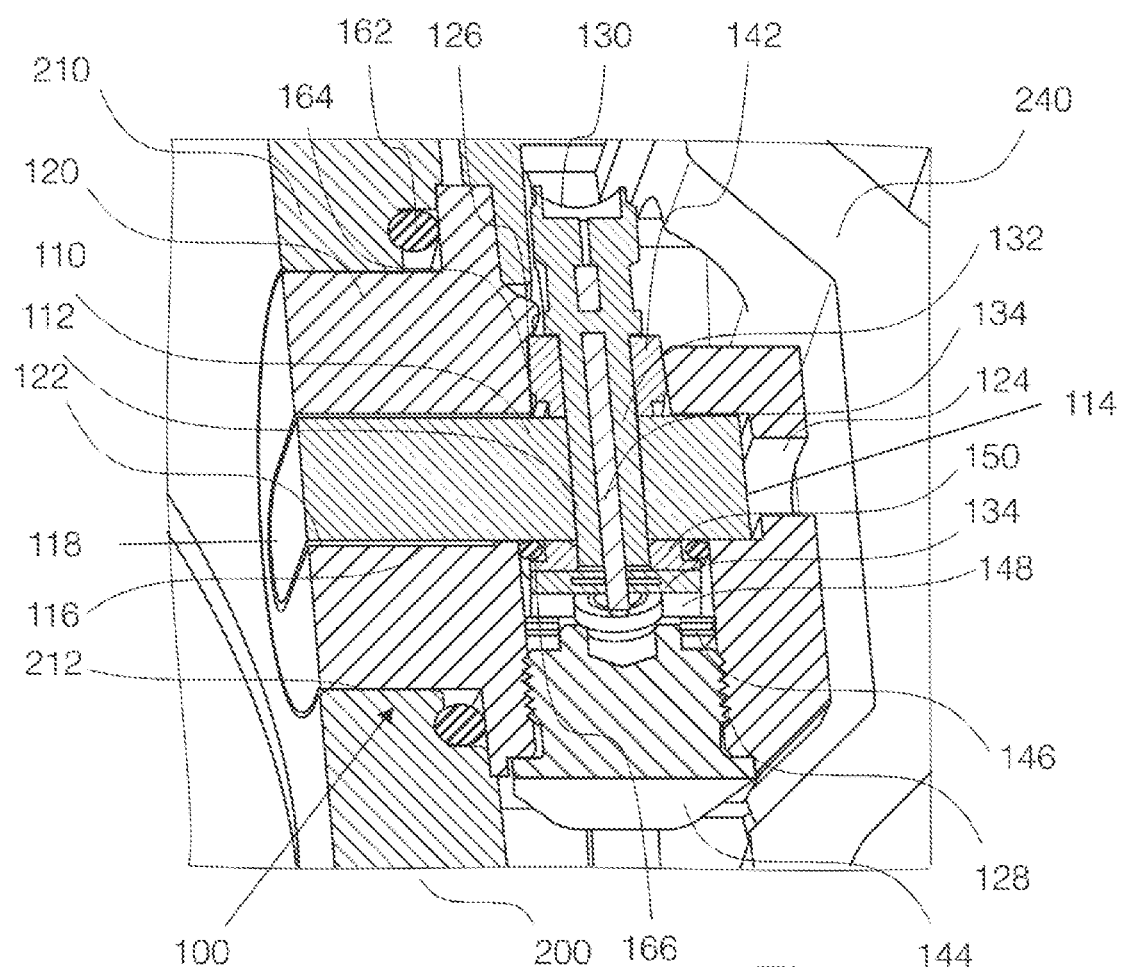
FIG. 1 shows a spatial representation of an exemplary embodiment of an antenna assembly according to the present disclosure.

The exemplary embodiment of an antenna assembly 100 according to the invention shown in FIG. 1 comprises a dielectric hollow conductor element 110 which has a ceramic material of high permittivity, e.g., aluminum oxide, zirconium dioxide, or titanium dioxide. The hollow conductor element 110 has a substantially cuboid basic shape with slightly rounded edges. A continuous coupler bore 112 extends through the hollow conductor element 110 in parallel to the largest main axis of inertia thereof. A lateral surface of the hollow conductor element 110, which surrounds the minimum main axis of inertia thereof, and a rear front face 114 of the hollow conductor element 110, the surface normal of which runs in the direction of the minimum main axis of inertia of the hollow conductor element, has a metallic coating 116 which is prepared by means of an active solder, wherein a second front face which faces away from the first front face 114 and serves as the emission surface 118 is free of the metallic coating. Furthermore, a circumferential end section of the lateral surface adjoining the emission surface is free of the metallic coating 116.

The antenna assembly 100 furthermore comprises a metallic support element 120, which is manufactured in particular from stainless steel and has a first end section having a cylindrical basic shape. A front face of the first end section has an emission opening, from which a hollow conductor chamber 122 extends into the support element 120, in which the hollow conductor element 110 is arranged, wherein the hollow conductor chamber 122 has walls which run substantially in parallel to the metalized surfaces of the hollow conductor element 110. The end section of the lateral surface of the hollow conductor element 110, which is free of metalization, is arranged close to the front face of the first end section of the support element 120. In a rear front face which faces away from the first front face, the support element 120 has a filling opening 124, which communicates with the hollow conductor chamber 122. In this case, an adhesive is pressed into the hollow conductor chamber 122 through the filling opening in order to fill up a circumferential gap volume between the surfaces of the hollow conductor element 110 and the walls of the hollow conductor chamber 122, as a result of which the gap volume, including the non-metalized end section of the lateral surface of the hollow conductor element 110 is sealed up to the emission surface 118. This reliably prevents the penetration of a medium from the first front face of the support element 120 into the hollow conductor chamber 122, in particular in order to avoid corrosion of the metallic coating 116 of the lateral surface. If the adhesive in the gap should become damaged close to the first front face, corrosion nevertheless does not occur, since the end section of the hollow conductor element 110 is not metalized.

The support element 120 furthermore has a coaxial-coupler bore 126 which extends in alignment with the coupler bore 112 of the hollow conductor element 110 from an outer surface of the support element 120 into the hollow conductor chamber 122. Furthermore, the support element 120 has a capacitor-chamber bore 128 which extends, likewise in alignment with the coupler bore 112 of the hollow conductor element 110, from a surface opposite the coaxial-coupler bore 126 into the hollow conductor chamber 122.

A perforated, metallic contact screw 142 is screwed into the coaxial-coupler bore 126 and presses with its front face against the metallic coating 116, thus establishing a defined, galvanic contact between the metallic coating 116 and the support element 120. A coaxial coupler 130, which has an outer conductor 132 and an inner conductor 134, is guided through the bore of the contact screw 142 and the coupler bore 112 of the hollow conductor element 110, wherein the inner conductor 134 projects into the capacitor-chamber bore 128. The outer conductor 132 is likewise in galvanic contact with the metallic coating 116 and the support element 120 via the contact screw 142.

In order to enable effective capacitive coupling of a microwave into the hollow conductor element 110 in a frequency range of, for example, approximately 2 GHz to 8 GHz, the coaxial coupler 130 is still to be terminated with a suitable capacitance, in particular because the hollow conductor element has a very large capacitance due to the selected materials. For this purpose, the inner conductor 134 of the coaxial coupler is connected to a capacitor 134, which is designed in particular as a printed circuit board capacitor and is arranged in the capacitor-chamber bore 128. The capacitor 134 is axially clamped in the capacitor-chamber bore 128 as follows. An annular disk-shaped pressure piece 114 rests with an annular axial projection on the lateral surface of the hollow conductor element 110. The capacitor 134 is supported on the pressure piece 114. Arranged on the side, facing away from the pressure piece 114, of the capacitor 134 is an insulating disk 148 which is axially clamped against the capacitor 134 with a disk spring stack 148 and a clamping screw 144 screwed into the capacitor-chamber bore 128. The disk spring stack 146 causes the clamping forces to fluctuate only slightly, despite different coefficients of thermal expansion of the components. In addition, the pressure piece 114 and the contact screw 142 each press an O-ring 166, 164 against the lateral surface of the hollow conductor element 110, as a result of which the capacitor-chamber bore 128 and the coaxial-coupler bore 126 are sealed with respect to the gap between the hollow conductor element 110 and the walls of the hollow conductor chamber 122.

Figure 2:
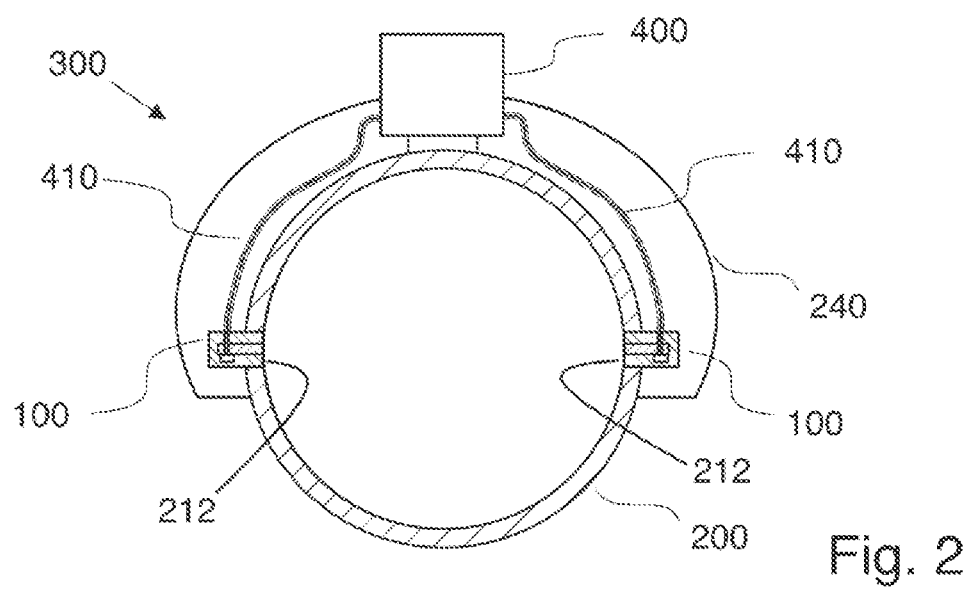
FIG. 2 shows a cross-section through an exemplary embodiment of a measuring assembly according to the present disclosure.

The support element 120 is arranged with the cylindrical end section in an antenna opening 212 of a tube wall 210 of a measuring tube 200, wherein a sealing ring 162 is axially clamped between the tube wall 210 and the support element 120. The antenna assembly 100 is covered with an optional protective housing 240, in which signal lines 410 (shown in FIG. 2) between an operating circuit and the coaxial coupler are also guided.

The measuring assembly 300 according to the invention comprises two antenna assemblies 100 and a measuring tube 200 with two, mutually-opposite antenna openings 212, in each of which one of the antenna assemblies 100 is mounted. Furthermore, the measuring assembly comprises an operating and measuring circuit 400, which are connected, via two coaxial lines 410, to the two antenna assemblies 100. The antenna assemblies and coaxial signal lines are still covered by a metallic protective housing 240, which, firstly, forms an additional EMC protection and, secondly, prevents contamination and mechanical effects upon the antenna assemblies and signal lines. The operating and measuring circuit is configured to radiate signal sequences of different frequencies in the frequency range of, for example, 2 to 8 GHz via one of the antenna assemblies into a medium located in the measuring tube 200 and to receive them with the other antenna assembly. The transit time or damping of the signal sequences can be used to determine the complex permittivity and, therefrom, further media properties, such as solids content.

Figure 3:
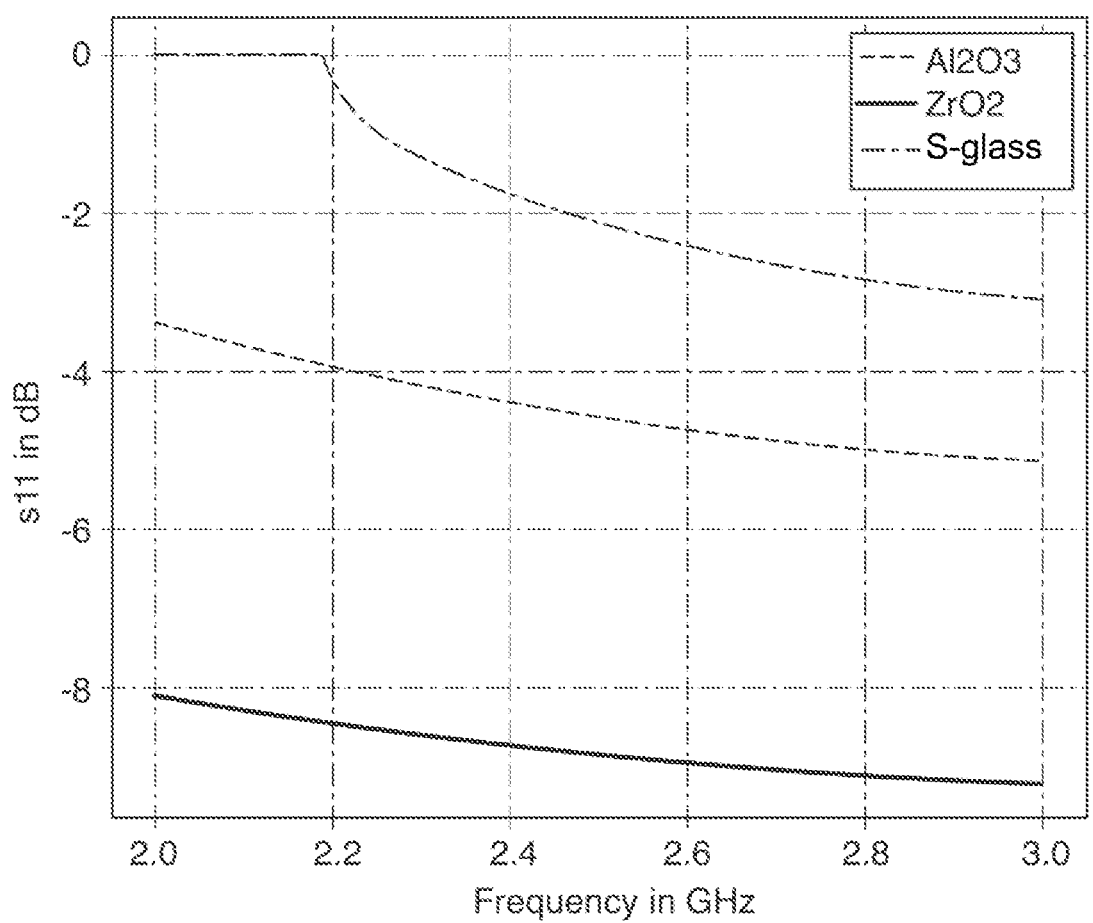
FIG. 3 shows a diagram of the proportion of the reflected conduction at the interface between the antenna and an aqueous medium.

For the performance of the measuring assembly, it is advantageous if reflection at the emission surface 118 of the hollow conductor element is as low as possible. This can be influenced by the material of the hollow conductor element 110. For this purpose, FIG. 3 shows the calculated reflection component on the emission surface for various materials of the hollow conductor element. Water was assumed here as medium, and the width of the hollow conductor element was set at 30 mm. If the hollow conductor element has an s-glass having an assumed permittivity of 5.1, wave propagation up to about 2.2 GHz is not possible at all, since these frequencies are below the cutoff frequency. A hollow conductor element made of Al2O3 is already significantly better suited than the hollow conductor elements of the prior art, even though reflections in the range of $s_{11} \approx -4$ dB still occur. With a ZrO2 filling, a consistently good transfer of the electromagnetic power into the water is achieved. This thus shows that, with the ceramic hollow conductor elements used according to the invention, efficient emission in media having high water content can be achieved for a given antenna geometry.

The invention claimed is:

1. An antenna assembly for emitting microwaves, comprising:
    a dielectric hollow conductor element; and
    a support element,
    wherein the dielectric hollow conductor element has an electrically-conductive surface at least along a circumferential lateral surface,
    wherein the dielectric hollow conductor element has an electrically non-conductive emission surface,
    wherein the dielectric hollow conductor element has a coupler receptacle, wherein the coupler receptacle includes a bore through which a pin-shaped coupler extends which is terminated with a capacitively-acting element,
    wherein the support element has a material having a modulus of elasticity of not less than 50 GPa,
    wherein the support element surrounds the dielectric hollow conductor element at least along the lateral surface,
    wherein the dielectric hollow conductor element is fixed in the support element, and
    wherein the support element has an emission opening and the emission surface of the dielectric hollow conductor element is aligned with the emission opening.

2. The antenna assembly according to claim 1, wherein the dielectric hollow conductor element has a permittivity of not less than 8 at 2 GHz.

3. The antenna assembly according to claim 1, wherein the dielectric hollow conductor element has a ceramic material that is aluminum oxide, zirconium dioxide, or titanium dioxide.

4. The antenna assembly according to claim 1, wherein the dielectric hollow conductor element has a basic shape of a parallelepiped.

5. The antenna assembly according to claim 1, wherein the electrically-conductive surface of the dielectric hollow conductor element includes a metallic coating.

6. The antenna assembly according to claim 4, wherein the metallic coating includes an active solder or active hard solder.

7. The antenna assembly according to claim 1, wherein the capacitively-acting element has a capacitor in the form of a printed circuit board piece with an integrated capacitor, a coaxial capacitor, or an open line piece.

8. The antenna assembly according to claim 1, wherein the support element has electrically-conductive surfaces which surround the dielectric hollow conductor element.

9. The antenna assembly according to claim 1, wherein the support element has a metallic material.

10. The antenna assembly according to claim 1, wherein the support element has a hollow conductor chamber for the dielectric hollow conductor element, wherein the hollow conductor chamber has cross-sections which run in parallel to the emission surface and are filled by the dielectric hollow conductor element to at least 90% of the cross-sectional area.

11. The antenna assembly according to claim 10, wherein the dielectric hollow conductor element is affixed with a polymer in the hollow conductor chamber.

12. The antenna assembly according to claim 1, wherein the support element has a process connection for connecting the antenna assembly to an antenna opening of a pipeline or of a container in order to position the emission opening in the region of the antenna opening.

13. A measuring assembly, comprising:
    a first antenna assembly, including:
        a dielectric hollow conductor element; and
        a support element,
        wherein the dielectric hollow conductor element has an electrically-conductive surface at least along a circumferential lateral surface,
        wherein the dielectric hollow conductor element has an electrically non-conductive emission surface,
        wherein the dielectric hollow conductor element has a coupler receptacle, wherein the coupler receptacle includes a bore through which a pin-shaped coupler extends which is terminated with a capacitively-acting element, wherein the support element has a material having a modulus of elasticity of not less than 50 GPa, wherein the support element surrounds the dielectric hollow conductor element at least along the lateral surface, wherein the dielectric hollow conductor element is fixed in the support element, and wherein the support element has an emission opening and the emission surface of the dielectric hollow conductor element is aligned with the emission opening;

a measuring tube having at least one antenna opening at which the first antenna assembly is mounted; and a measuring and operating circuit connected to each antenna assembly via a respective signal line.

14. A measuring assembly, comprising:

a first antenna assembly, including:
  a dielectric hollow conductor element; and
  a support element,
    wherein the dielectric hollow conductor element has an electrically-conductive surface at least along a circumferential lateral surface,
    wherein the dielectric hollow conductor element has an electrically non-conductive emission surface,
    wherein the dielectric hollow conductor element has a coupler receptacle,
    wherein the support element has a material having a modulus of elasticity of not less than 50 GPa,
    wherein the support element surrounds the dielectric hollow conductor element at least along the lateral surface,
    wherein the dielectric hollow conductor element is fixed in the support element, and
    wherein the support element has an emission opening and the emission surface of the dielectric hollow conductor element is aligned with the emission opening;

a second antenna assembly embodied in the same manner as the first antenna assembly;

a measuring tube having two, mutually-opposite antenna openings on each of which one of the antenna assemblies is mounted; and a measuring and operating circuit connected to each antenna assembly via a respective signal line.

* * * * *